United States Patent

[11] 3,623,943

| [72] | Inventors | Dietrich Altenpohl<br>Feldmeilen;<br>Jean Schrade, Zurich, both of Switzerland |
|---|---|---|
| [21] | Appl. No. | 41,923 |
| [22] | Filed | June 1, 1970 |
| [45] | Patented | Nov. 30, 1971 |
| [73] | Assignee | Swiss Aluminium Ltd.<br>Chippis, Switzerland |
| [32] | Priority | June 6, 1969 |
| [33] | | Switzerland |
| [31] | | 8621/69 |

[54] MULTILAYER COMPOSITE PLATE
4 Claims, 1 Drawing Fig.

[52] U.S. Cl. ................................................ 161/218,
117/132 C, 117/138.8 E, 156/306, 156/332,
156/334, 161/216, 161/252, 161/254
[51] Int. Cl. ............................................... B32b 15/08
[50] Field of Search .......................................... 161/216,
218, 252–254, 214, 217; 156/332, 334, 306;
229/3.5 MF; 117/132 C, 138.8 E

[56] References Cited
UNITED STATES PATENTS

| 3,249,570 | 5/1966 | Potts et al. | 260/29.6 |
| 3,382,136 | 5/1968 | Bugel et al. | 161/216 |
| 3,389,109 | 6/1968 | Harmon et al. | 260/29.6 |
| 3,390,704 | 7/1968 | Woodell | 161/216 |

*Primary Examiner*—Willard E. Hoag
*Attorney*—Ernest F. Marmorek

ABSTRACT: A multilayer composite plate having at least one cover layer from a nonferrous metal has a core made from a polyolefin layer with a melting region over 120° C., an adhesive layer of ethylene interpolymer containing a carboxyl group connects the polyolefin layer with the metal cover layer, and an intermediate layer from polyethylene with a melting region below 120° C. placed between the polyolefin layer and the adhesive layer.

PATENTED NOV 30 1971
3,623,943
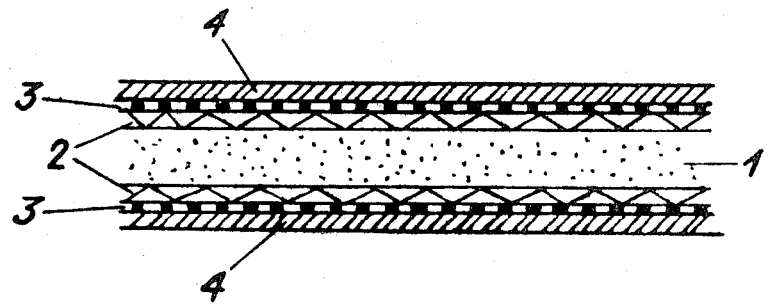
INVENTORS:
DIETRICH ALTENPOHL
BY and JEAN SCHRADE,
Their Attorney.

MULTILAYER COMPOSITE PLATE

BACKGROUND OF THE INVENTION

There are various composite structural materials known, such as those made from plastics and metal. Special interest developed in composite plates having a metal cover layer preferably from aluminum and a core layer sandwiched between the cover layers, such core layer being made from polyolefin. Such composite plate found application as construction material in the metal, airplane and ship building industries since it possesses various advantageous properties.

In preparing the known sandwiched plates from a polyethylene core and two cover layers from aluminum, the individual layers become connected to each other under the application of pressure and heat and by using an adhesive thermoplastic foil consisting of an ethylene interpolymer containing a carboxyl group. An adhesive foil of the above-mentioned kind is known under the Trade Name Lupolen Kr 1285. It has been found, however, that with the use of such adhesive foil sufficient securement can be attained only between the metal and a polyethylene having lower density. Polyethylenes having higher density and other polyolefins do not allow for a reliable connection by the use of such adhesive foil. Such polyolefins are, however, very desirable if used as core layers in the composite plates since they would enhance the possibility of applications of such plates in view of the fact that they possess a high heat resistant quality and better mechanical characteristics than polyethylenes having lower density.

SUMMARY OF THE INVENTION

It is, therefore, the primary object of the present invention to provide an improved composite plate using polyolefins of high density as a core layer.

According to the invention a multilayer composite plate having at least one cover layer of metal and a core layer of polyolefin which are connected to each other by means of an adhesive layer consisting of an ethylene interpolymer containing a carboxyl group. In accordance with the invention the core layer consists of a polyolefin having a melting region starting over 120° C. and between the core layer and the adhesive layer an intermediate layer is placed consisting of a polyethylene having a melting region lying below 120° C.

BRIEF DESCRIPTION OF THE DRAWING

The single FIGURE illustrates in cross section a composite plate according to the present invention.

DESCRIPTION OF A PREFERRED EMBODIMENT

The interpolymer of the adhesive layer is preferably a tertiary polymer of ethylene with acrylic acid and acrylate (Lupolen KR 1285). This polymer has a melting point of about 100° C. Obviously the difference in the melting regions of polyethylenes having high densities over 120° C. and of the other polyolefins such as polypropylene, polybutylene, polyisobutylene and polymethylpentene having even higher melting regions, is too large to allow for a reliable connection which, however, becomes possible by placing an intermediate layer having a melting range falling between the above-mentioned ranges, between the core layer and the adhesive layer.

The aforesaid adhesive layer may also be said tertiary polymer containing peroxide and the acrylic as aforementioned. (Reference is had to Rohm and Hass technical bulletin "Organic Chemicals" CO–2, May 1959).

Inasmuch as in polyethylenes the density increases parallel with the melting region, the object of the invention is well met when between the core layer of polyethylene having a high density and the adhesive layer an intermediate layer of polyethylene having low density is placed, whereupon the density limit lies at about 0.94 g./cm.$^3$.

In the preferred embodiment the composite plate according to the present invention consists of a pair of cover layers of a metal and a core the thickness of which is about 2–30 mm. As cover layers one may consider foils or sheet metal, nonferrous metals, preferably aluminum with a thickness in the range of 0.2–1.2 mm. The adhesive foil has a thickness preferably of 0.02–0.4 mm., and the intermediate layer has a thickness of about 0.02–1 mm.

The composite plate is made in a known manner by pressing the layers together at an elevated temperature. The temperature depends on the pressure and vice versa. Its usual range is 80–250° C., preferably between 130–200° C. If the composite plate according to the present invention is made in a continuous process, then on the still warm extruded core layer on one or on both sides first a foil of polyethylene in the form of an intermediate layer is placed, then on the top of the intermediate layer of layers an adhesive layer is placed and, finally, the metal foil is placed on one or both sides of the plate by means of a roller, for example.

EXAMPLE

A polyethylene plate having a thickness of about 3.0 mm. and having a density of about 0.95 g./cm.$^3$ and a melting region of about 130°–150° C. is sandwiched from its both sides between the following layers: a foil 2 of polyethylene having a thickness of about 0.1 mm. and a density of about 0.91 g./cm.$^3$ and a melting region of about 80°–100° C., an adhesive layer 3 having a thickness of about 0.1 mm. made from an interpolymer of ethylene-acrylic acid (Lupolen KR 1285), and a sheet of aluminum 4 having a thickness of about 0.5 mm. The above-described layers are pressed together at a temperature of the pressing plates in the neighborhood of about 180° C. during the period of one minute and at a pressure of about 1 kg./cm.$^2$ and are allowed to cool under pressure.

The adhesion between the core and the cover layer or sheet is measured according to the peeling moments established by the ASTM Standards 1781. Such Standard has been measured at 15 kg.cm./cm. A composite plate which has been made without the benefit of the intermediate layer having the density of 0.91 g./cm.$^3$ has been found to possess a peeling moment of only about 2.0 kg.cm./cm.

Similar results were obtained when the core was made from polypropylene, polyisobutylene and polymethylpentene.

We wish it to be understood that we do not desire to be limited to the exact details of construction shown and described, for obvious modifications will occur to a person skilled in the art.

Having thus described the invention, what we claim as new and desire to be secured by Letters Patent, is as follows:

1. A multilayer composite plate comprising at least one nonferrous metal cover layer;
   a core layer made from a polyolefin having a melting region beginning over 120° C.;
   an adhesive layer made from an ethylene interpolymer containing a carboxyl group and
   adhering to said cover layer; and an intermediate layer disposed between said core layer and adhesive layer, said intermediate layer being made from polyethylene having a melting region lying below 120° C. said intermediate layer being in direct adhering contact with said core layer.

2. The multilayer composite plate as claimed in claim 1, wherein said core layer has adhered to opposite major surfaces thereof two nonferrous metal cover layers by means of the sequence of intervening layers described in claim 1.

3. The multilayer composite plate as claimed in claim 1, wherein said core layer has a density of over 0.94 g./cm.$^3$ and said intermediate layer has a density less than said core layer.

4. The multilayer composite plate, as claimed in claim 3, wherein said adhesive layer consists of a peroxide containing tertiary polymer of ethylene with acrylic acid and acrylate.

* * * * *